United States Patent [19]

Hatano

[11] Patent Number: 5,155,608
[45] Date of Patent: Oct. 13, 1992

[54] DOUBLE-LAYERED TYPE TN-LCD CELL ($O_1 = O_2$)

[75] Inventor: Akitsugu Hatano, Tenri, Japan
[73] Assignee: Sharp Kabushiki Kaisha, Japan
[21] Appl. No.: 808,072
[22] Filed: Dec. 10, 1991

Related U.S. Application Data

[63] Continuation of Ser. No. 382,748, Jul. 19, 1989, abandoned.

[30] Foreign Application Priority Data

Jul. 19, 1988 [JP] Japan .................. 62-180535

[51] Int. Cl.⁵ .................. G02F 1/133; G02F 1/13; G02F 1/137
[52] U.S. Cl. .................. 359/53; 359/93; 359/102
[58] Field of Search .................. 350/334, 335, 350 R, 350/347 E, 347 R; 359/53, 73, 93, 102

[56] References Cited

U.S. PATENT DOCUMENTS

| | | | |
|---|---|---|---|
| 4,408,839 | 11/1983 | Wiener-Avnear | 350/335 |
| 4,436,379 | 3/1984 | Funada et al. | 350/335 |
| 4,443,065 | 4/1984 | Funada et al. | 350/335 |
| 4,653,865 | 3/1987 | Kando et al. | 350/347 E |
| 4,844,569 | 7/1989 | Wada et al. | 350/347 R |
| 4,941,737 | 7/1990 | Kimura | 350/335 |
| 4,952,029 | 8/1990 | Hayashi et al. | 350/335 |

FOREIGN PATENT DOCUMENTS

| | | | |
|---|---|---|---|
| 0246842 | 11/1987 | European Pat. Off. | 350/335 |
| 0320283 | 6/1989 | European Pat. Off. | 350/335 |

OTHER PUBLICATIONS

Japanese Journal of Applied Physics/Part 2: Letters, vol. 26, No. 11, Nov. 1987, pp. L1784-L11786, Tokyo, JP.; K. Katoh et al.
"Multicolor Display by Double-Layered Supertwisted Nematic LCD" by Kimura et al., Sid 88 Digest pp. 49-52.

Primary Examiner—Janice A. Howell
Assistant Examiner—Anita Pellman Gross
Attorney, Agent, or Firm—Morrison & Foerster

[57] ABSTRACT

The liquid crystal display device comprises a multi-layered-type liquid crystal cell that is composed of first and second cell layers, the cell containing liquid crystal molecules with a twisted nematic orientation therein, wherein the angle of twist of the liquid crystal molecules in the first cell layer is opposite to that of twist of the liquid crystal molecules in the second cell layer; the orientation of the liquid crystal molecules in the first cell layer that is the nearest the second cell layer is at an angle of 70° to 150° to that of the liquid crystal molecules in the second cell layer that are nearest the first cell layer; and the angle of twist of the liquid crystal molecules in the first cell layer is different from the angle of twist of the liquid crystal molecules in the second cell layer, thereby producing a black-and-white display image with high contrast without giving rise to color and a colored display image with high contrast. Also, the dependence of the birefringence $\Delta n_1$ of the first cell layer on the wavelength of light is larger than that of the birefringence $\Delta n_2$ of the second cell layer.

4 Claims, 5 Drawing Sheets

FIG.1

DIRECTION OF LIGHT INCIDENCE

LIQUID-CRYSTAL MOLECULES

ANGLES OF THE ORIENTATION OF THE LIQUID-CRYSTAL MOLECULES IN THE FIRST CELL LAYER TO THAT OF THE LIQUID-CRYSTAL MOLECULES IN THE SECOND CELL LAYER, $\alpha$ (DEGREES)

FIG.6a DOUBLE-LAYERED-TYPE TN-LCP CELL ($\theta_1 \neq \theta_2$)

FIG.6b DOUBLE-LAYERED-TYPE TN-LCP CELL ($\theta_1 \neq \theta_2$)

FIG.7
DOUBLE-LAYERED-TYPE
TN-LCP CELL ($\theta_1 \neq \theta_2$)

FIG.8
DOUBLE-LAYERED-TYPE
TN-LCP CELL ($\theta_1 \neq \theta_2$)

DOUBLE-LAYERED TYPE TN-LCD CELL ($O_1=O_2$)

This application is a continuation of application Ser. No. 382,748, filed Jul. 19, 1989, now abandoned.

BACKGROUND OF THE INVENTION

1. Field of the Invention

This invention relates to a double-layered-type liquid crystal display device with the use of a twisted nematic display process that can produce a black-and-white display image with high contrast without giving rise to color and a colored display image with high contrast.

2. Description of the Prior Art

Liquid crystal display devices are now used in clocks, electronic calculating machines, computer terminals, as well as word processor displays, televisions, and a variety of other uses in many fields. Recently, there has been an extremely large demand for liquid crystal display devices because of the changes to multicolor and full-color displays, which are already being made use of in the fields of graphic display and image display. Color displays that have been widely put into practical use are attained by a liquid crystal cell with color filter layers. The liquid crystal cell functions as a light-switcher and produces various colors. The main kind of display mode is a twisted nematic (TN) display mode attained by a liquid crystal cell in which the liquid crystal molecules are twisted 90° so that high contrast, etc., can be obtained. However, with this TN display mode, the dependence of the display characteristics on the wavelength of light is great, and it is not possible to achieve switching of light uniformly over the entire spectrum of visible light. In particular, with the normally closed display process in which the axes of absorption of the two polarizers are in parallel, there is the problem that light leakages at the time of the application of voltage gives rise to color.

With a color display device that causes light-switching by the use of a TN display that has this kind of a color filter layer, there are two main kinds of driving methods. One of them involves the active-matrix drive method that uses a liquid crystal cell that has picture elements provided with non-linear devices such as diodes or switching elements such as thin-film transistors. The other method involves the duty drive method in which the liquid crystals of a liquid crystal cell without picture elements are successively driven. With the latter method, the steepness in the vicinity of the threshold value of the optical characteristics of the liquid crystals is important, this is a problem with the TN displays that are now being used. In order to improve the optical characteristics so that steepness in the vicinity of the threshold value can be attained, it has been suggested that a supertwisted nematic (STN) process that gives liquid crystal molecules that are twisted at angles of around 180°-270° be used. With the STN process, the curve in the vicinity of the threshold value increases sharply, and even when the duty ratio increases, it is possible to obtain a high contrast ratio. However, because birefringence effects of liquid crystals are used, the dependence of the display characteristics on the wavelength is theoretically higher than with the TN display, so it is very difficult to adapt it for use in a full-color display.

SUMMARY OF THE INVENTION

The double-layered type liquid crystal display device of this invention, which overcomes the above-discussed and numerous other disadvantages and deficiencies of the prior art, comprises a multi-layered-type liquid crystal cell that is composed of first and second cell layers, said cell containing liquid crystal molecules with a twisted nematic orientation therein, wherein the angle of twist of the liquid crystal molecules in the first cell layer is opposite to that of twist of the liquid crystal molecules in the second cell layer; the orientation of the liquid crystal molecules in the first cell layer that are nearest the second cell layer is at an angle of 70° to 150° to that of the liquid crystal molecules in the second cell layer that are nearest the first cell layer; and the angle of twist of the liquid crystal molecules in the first cell layer is different from the angle of twist of the liquid crystal molecules in the second cell layer.

In a preferred embodiment, the first cell layer has a voltage-applying means.

In a more preferred embodiment, the angle of twist of the liquid crystal molecules in said first cell layer is set to be in the range of 180° to 360° and the angle of twist of the liquid crystal molecules in said second cell layer is set to be in the range of 30° to 390°.

In a preferred embodiment, the relationship between the pitch P of twist of the liquid crystal molecules in the cell layer and the thickness d of the liquid crystal molecules in said cell layer is as follows:

$$\theta 1360° - \tfrac{1}{4} < d/p \lesssim \theta 1360°.$$

In a preferred embodiment, the relationship between the product $\Delta n_1 \cdot d_1$ of the birefringence $\Delta n_1$ and the thickness $d_1$ of the liquid crystal layer in the first cell layer and the product $\Delta n_2 \cdot d_2$ of the birefringence $\Delta n_2$ and the thickness $d_2$ of the liquid crystal layer in the second cell layer in represented by the following inequality:

$$0.7 < \Delta n_1 \cdot d_1 / \Delta n_2 \cdot d_2 < 1.4.$$

In a more preferred embodiment, the absolute value of each of the products $\Delta n_1 \cdot d_1$ and $\Delta n_2 \cdot d_2$ is in the range of 0.3 to 3.0.

In a more preferred embodiment, the dependence of the value of $\Delta n_1$ on the wavelength of light is larger than that of the value of $\Delta n_2$ on the wavelength of light.

Thus, the invention described herein makes possible the objectives of providing a liquid crystal display device that produces a black-and-white display image with high contrast without giving rise to color and a colored display image with high contrast.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
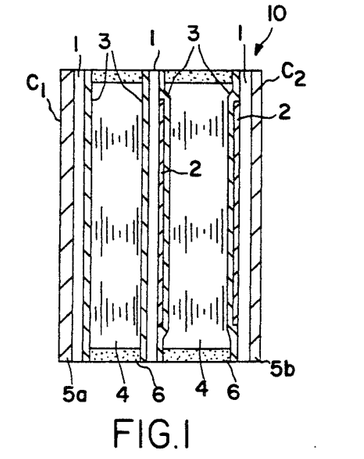
FIG. 1 is a sectional view showing the fundamental cell structure of a double-layered-type liquid crystal display device of this invention.

This invention provides a liquid crystal display device, the fundamental double-layered cell structure of which is, as shown in FIG. 1, composed of a first cell layer $C_1$ and a second cell layer $C_2$ that contains liquid crystal molecules therein with a twisted nematic orientation. Each cell layer is composed of transparent substrates 1 of glass, acrylic resins, or the like, transparent conductive films 2 of ITO (a film that is mainly made of indium oxide), nesa film, or the like positioned on the substrate 1, orientation films 3 of inorganic film made of $SiO_2$, SiO, or the like or an organic film made of polyimide, polyvinyl alcohol, nylon, acrylic resins, or the like for the orientation of liquid crystal molecules positioned on the substrates 1 and the transparent conductive films 2, and a polarizer 5a positioned on the back face of the substrate 1. Both ends of each cell layer are sealed by sealing substances 6. A liquid crystal layer 4 is disposed in each of the cell layers $C_1$ and $C_2$. The transparent conductive films 2 act as electrodes when voltage is applied to the liquid crystal layer 4 of the first cell layer $C_1$.

Figure 2A:
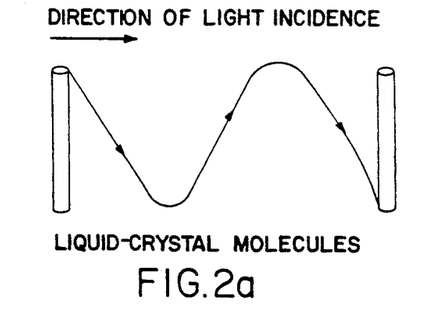
FIGS. 2a and 2b, respectively, are diagrams showing twists of liquid crystal molecules in the right and left directions.
Figure 2B:
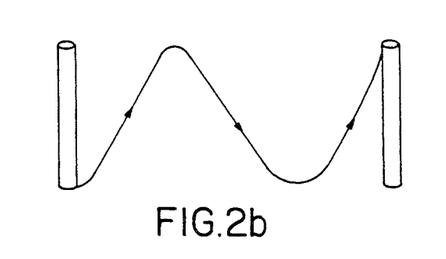

The direction in which the liquid crystal molecules of the liquid crystal layer 4 in one cell layer are helically twisted is opposite to the direction in which the liquid crystal molecules of the liquid crystal layer 4 in the other cell layer are twisted. The directions of twist of the liquid crystal molecules are set as shown in FIGS. 2a and 2b in which FIG. 2a shows the twist of the liquid crystal molecules in the right direction with regard to the direction in which light from a light source is incident upon the cell and FIG. 2b shows twist of the liquid crystal molecules in the left direction with regard to the light incidence direction. When an optically active substance is added to a nematic liquid crystal, the liquid crystal molecules form a twisted structure. To cause the liquid crystal molecules to give rise to a twist in the right direction, the substance that is represented by the following chemical structure is used as an optically active substance:

(Merck)

To cause the liquid crystal molecules to give rise to a twist in the left direction, cholesteryl nonanoate (Merck), S-811 (Merck), etc., are used as optically active substances.

Figure 3:
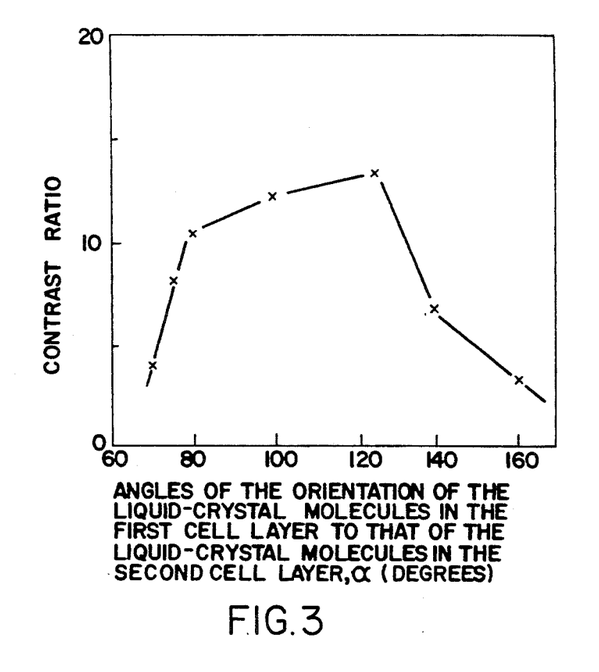
FIG. 3 is of a characteristic curve showing the relationship between the contrast ratio and the angle between the orientation of the liquid crystal molecules in the first cell layer in the vicinity of the second cell layer and the orientation of the liquid crystal molecules in the second cell layer in the vicinity of the first cell layer.

FIG. 3 shows the relationship between the contrast ratio and the angle $\alpha$ between the orientation of the liquid crystal molecules of the first cell layer $C_1$, that are nearest the second cell layer $C_2$ and the orientation of the liquid crystal molecules of the second cell layer $C_2$ that are nearest the first cell layer $C_1$, wherein the angles $\theta_1$ and $\theta_2$ of twist of the liquid-crystal molecules of the liquid crystal layers in the first and second cell layers $C_1$ and $C_2$ are set as follows: $\theta_1 = 270°$ and $\theta_2 = 240°$, and the values $\Delta n_1 \cdot d_1$ and $\Delta n_2 \cdot d_2$ ($\Delta n_1$ and $\Delta n_2$ being the birefringence of the liquid crystals in the first and second cell layers, respectively, and $d_1$ and $d_2$ being the thicknesses of the liquid crystal layers in the first and second cell layers, respectively) of the liquid crystal layers in the first and second cell layers are set as follows: $\Delta n_1 \cdot d_1 = \Delta n_2 \cdot d_2 = 1.0$. It can be seen from FIG. 3 that the value of $\alpha$ should be set to be 70° to 150° in order to obtain a contrast ratio that is around ½ times or more the maximum contrast ratio.

Figure 4:
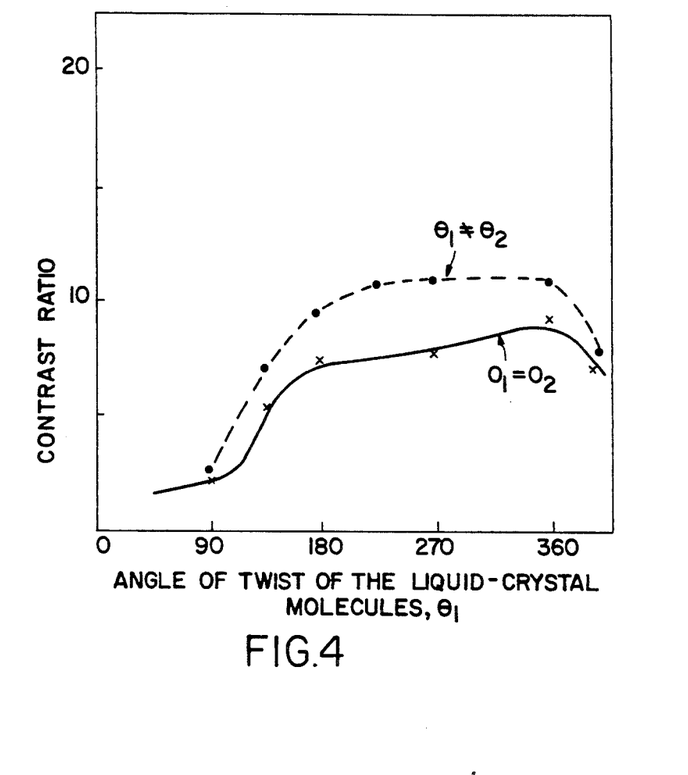
FIG. 4 is of a characteristic curve showing the relationship between the angles $\theta_1$ and $\theta_2$ of twist of the liquid crystal molecules in the first and second cell layers, respectively, and the contrast ratio of display images.
Figure 5:
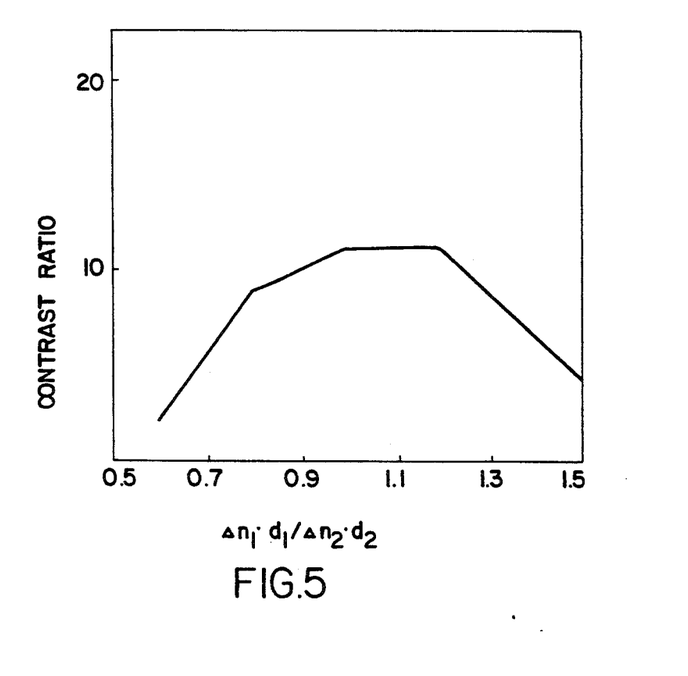
FIG. 5 is of a characteristic curve showing the relationship between the value of $\Delta n_1 \cdot d_1 / \Delta n_2 \cdot d_2$ and the contrast ratio.

With the angles $\theta_1$ and $\theta_2$ of twist of the liquid crystal layers in the first cell layer (on which voltage is applied) $C_1$ and the second cell layer (that acts as a compensation cell layer) $C_2$, as shown in FIG. 4, the contrast ratio at the time when the value of $\theta_1$ is not equal to that of $\theta_2$ (i.e., $\theta_1 \neq \theta_2$ wherein $\theta_2 = \theta_1 - 30°$) is higher than that at the time when the value of $\theta_1$ is equal to that of $\theta_2$ (i.e., $\theta_1 = \theta_2$). In addition, by considering the display contrast and the visibility, as shown in FIG. 4, the angle $\theta_1$ of twist of the liquid crystal molecules is preferably set to be in the range of about 180° to about 360° based on the relationship between the angle of twist and the contrast ratio. If the angle $\theta_1$ of twist of the liquid crystal molecules exceeds 360°, a domain appears in which the liquid crystals have their orientation disarrayed at the time of the application of voltage, resulting in a dispersion of light, which readily gives rise to a decrease in contrast. The angle $\theta_2$ of twist of the liquid crystal molecules in the compensation cell layer $C_2$ is preferably set to be a value that is different from the angle $\theta_1$ of twist of the liquid crystal molecules in the voltage-applied cell layer $C_1$, said value of $\theta_2$ being in the range of about 30° to about 390°.

Moreover, to obtain sharp threshold characteristics of contrast, the specific pitch P of the twist of liquid crystal molecules in one cell layer with a voltage-applying means becomes very important. The ratio of the thickness d of the liquid crystal layer to the pitch P of the twist of the liquid crystal molecules, d/p, is preferably set by the use of experimental data as follows:

$$\theta/360° - \tfrac{1}{4} < d/p \leq \theta/360°,$$

wherein $\theta$ is the angle of twist of liquid crystal molecules. This requirement applies in the case where the pretilt angle of the liquid crystals is about 10° or less. In the case where the pretilt angle exceeds 10°, the range of this value of d/p becomes different.

The liquid crystal cell layers of this invention are constructed so that the following relationship can be satisfied because the maximum contrast ratio exists therein:

$$0.7 < \Delta n_1 \cdot d_1 / \Delta n_2 \cdot d_2 < 1.4$$

Moreover, in light of brightness and contrast ratio, the absolute value of each of $\Delta n_1 \cdot d_1$ and $\Delta n_2 \cdot d_2$ is preferably set to be in the range of 0.3 to 3.0. To prevent the display images produced by this liquid crystal device from giving rise to color, the dependence of the value of $\Delta n_1$ of the liquid crystal of the first cell layer $C_1$ on the wavelength of light is preferably set to be larger than the dependence of the value of $\Delta n_2$ of the liquid crystal of the second cell layer $C_2$ on the wavelength of light.

EXAMPLE 1

Figure 6A:
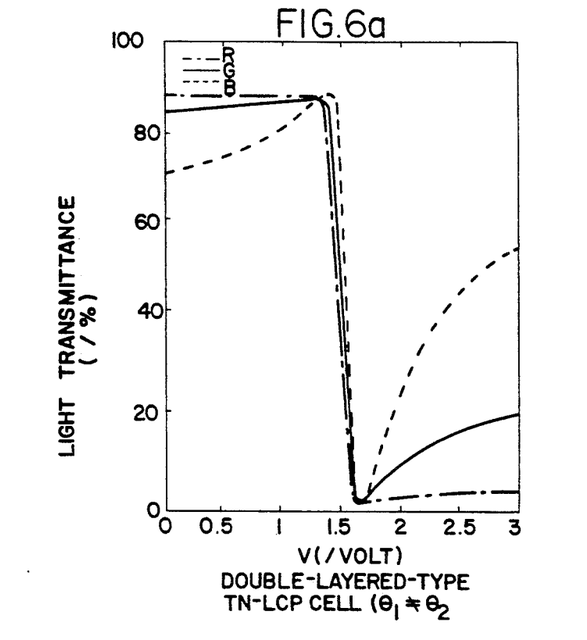
FIG. 6a is of characteristic curves showing the relationship between the applied voltage and the light transmittance with regard to the display device ($\theta_1 \neq \theta_2$) of FIG. 1 of this invention.
Figure 6B:
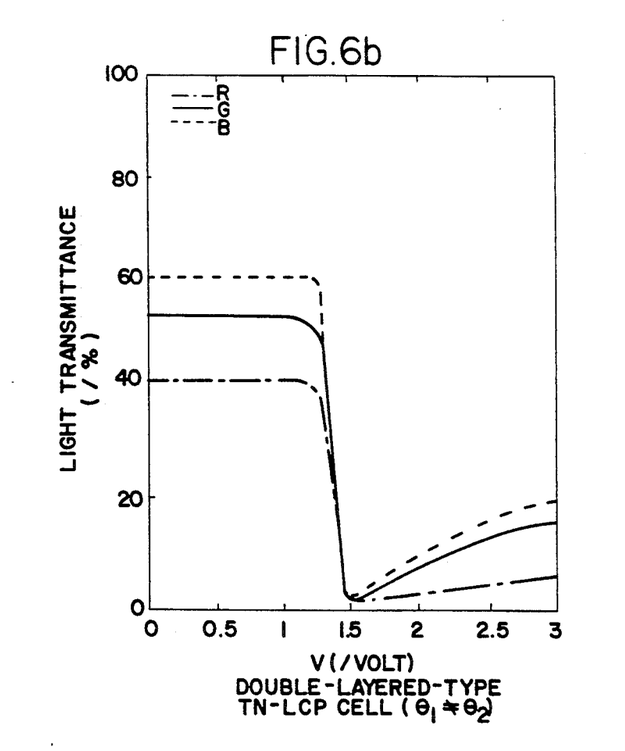
FIG. 6b is of characteristic curves showing the relationship between the applied voltage and the light transmittance with regard to a double-layered type TN-LCD ($\theta_1 = \theta_2$).

FIG. 1 shows the double-layered cell structure of a liquid crystal display device (i.e., a double-layered-type TN-LCD) of this invention, in which the transparent substrate 1 is made of glass. A transparent conductive film 2 with a thickness of about 1500Å is disposed on each of the glass substrates 1 of the first cell layer $C_1$ alone by vapor deposition of ITO and patterned by an etching technique. On the glass substrates 1 and the transparent conductive films 2, liquid crystal molecule orientation films 3 of polyimide are formed with a thickness of about 500Å by a spin coating technique, the surfaces of which are treated by being rubbed with cloth, causing the liquid crystal molecules to be in a twisted nematic orientation. The end portions of the cell layers are sealed by a sealing substance 6. As a liquid crystal substance of the first cell layer $C_1$, a nematic liquid crystal, EX-02 (Rodick), is used. As a liquid crystal substance of the second cell layer $C_2$, a nematic liquid crystal, ZLI-3021-000 (Merck), is used. To the liquid crystal layer 4 of the first cell layer $C_1$, 0.60 wt % of cholesteryl nonanoate is added and 0.90 wt % of CB15 is added to the liquid crystal layer 4 of the second cell layer $C_2$. The angle of twist of the liquid crystal molecules in the first cell layer $C_1$ is opposite to that of the liquid crystal molecules in the second cell layer $C_2$, wherein $\theta_1 = 270°$ and $\theta_2 = 240°$. The thicknesses of the liquid crystal layers in the first and second cell layers $C_1$ and $C_2$ (i.e., the thicknesses of the cell layers $C_1$ and $C_2$) are 8 μm and 10 μm, i.e., $d_1 = 8$ μm and $d_2 = 10$ μm. The value of $P_1$ is 13 μm and the value of $P_2$ is 20 μm. The pretilt angle of the liquid crystals on the substrates 1 is about 8°. The angle $\alpha$ between the orientation of the liquid crystal molecules of the first cell layer $C_1$ that are nearest the second cell layer $C_2$ and the orientation of the liquid crystal molecules of the second cell layer $C_2$ that is the nearest the first cell layer $C_1$ is about 90° (i.e., $\alpha =$ about 90°). The polarizer 5a and the detector 5b, which are made of an iodine-system polarizing board, are placed at an angle of about 30° therebetween (i.e., $|\Psi| =$ about 30°). FIGS. 6a and 6b show the dependence of the light transmittance on the applied voltage with regard to the double-layered-type TN-LCD of this invention and a reference standard double-layered-type TN-LCD (in which $\theta_1 = \theta_2 = 270°$), respectively, wherein the wavelengths λ used herein for red color, green color, and blue color are 610 nm, 550 nm, and 450 nm, respectively, indicating that at the time of the application of a voltage near the threshold value, the transmittance of the wavelength for each color in the double-layered-type cell is lower than that of the wavelength for each color in the reference standard cell (wherein $\theta_1 = \theta_2$). This means that the double-layered-type cell can attain high contrast. Moreover, the dependence of the applied-voltage-transmittance characteristics on the wavelengths with regard to the double-layered-type cell is much smaller than that of the applied-voltage-transmittance characteristics on the wavelengths with regard to the reference standard cell, and thus, the double-layered-type cell can produce a distinct black-and-white display image of a positive-display type.

EXAMPLE 2

Figure 7:
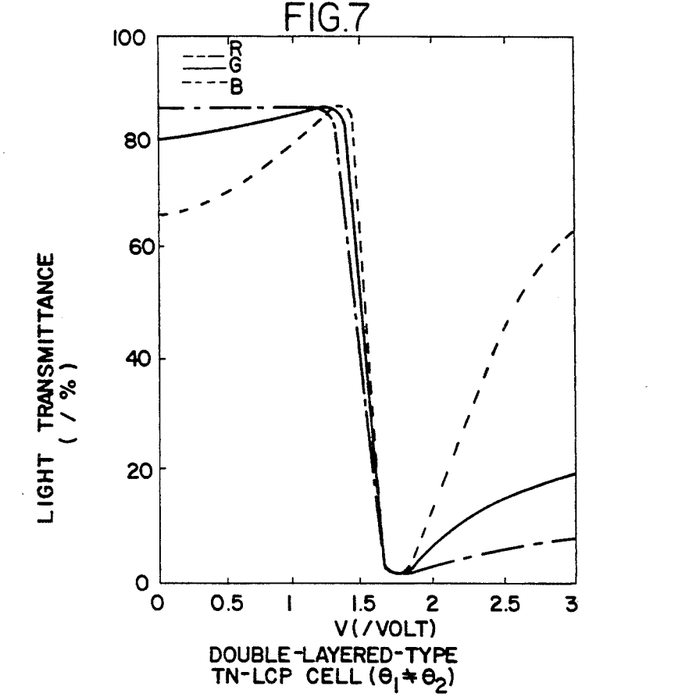
FIG. 7 is of characteristic curves showing the relationship between the applied voltage and the light transmittance with regard to another double-layered display device of this invention.

This example provides another liquid crystal display device of this invention, which has the same structure as that of Example 1, except that 0.50 wt % of cholesteryl nonanoate is added to the liquid crystal layer 4 of the first cell layer $C_1$ and 0.30 wt % of CB15 is added to the liquid crystal layer 4 of the second cell layer $C_2$, and moreover the angles $\theta_1$ and $\theta_2$ of twist of the liquid crystal molecules in the first and second cell layers $C_1$ and $C_2$ are set to the values of 240° and 150°, respectively (i.e., $\theta_1 = 240°$ and $\theta_2 = 150°$). The polarizer 5a and the detector 5b are placed at an angle of about 90°. The other conditions are the same as those of Example 1. FIG. 7 shows the dependence of the light transmittance on the applied voltage with regard to the double-layered type TN-LCD of this invention, wherein the wavelengths λ examined herein are 610 nm for red, 550 nm for green, and 450 nm for blue. FIG. 7 indicates that the transmittance characteristics of the wavelengths for red, green, and blue in the double-layered-type cell are sufficiently high and agree with each other, so that a bright, distinct black-and-white display image of the positive-display type can be attained without giving rise to color. Moreover, the said double-layered-type cell has sharp threshold characteristics, so that the said cell can produce a display image with high contrast.

EXAMPLE 3

Figure 8:
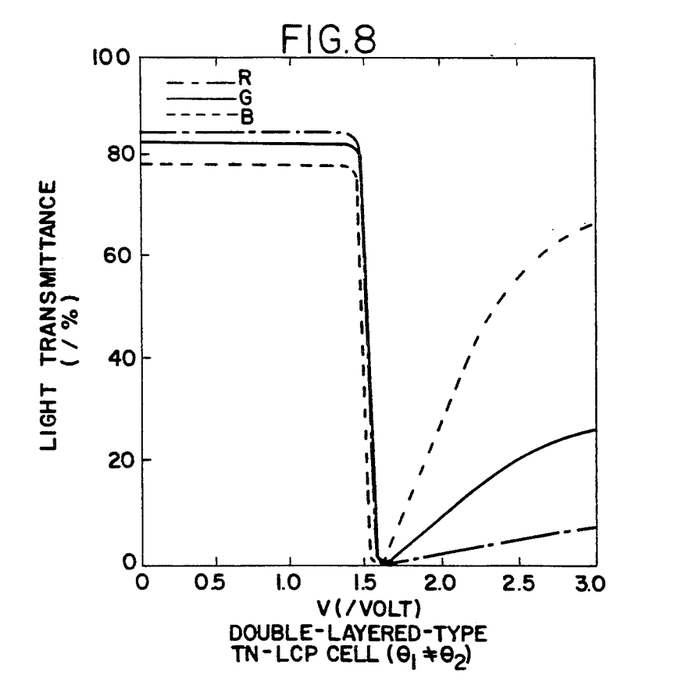
FIG. 8 is of characteristic curves showing the relationship between the applied voltage and the light transmittance with regard to another double-layered display device of this invention.

This example provides another liquid crystal display device of this invention, which has the same structure as that of Example 1, except that 0.50 wt % of cholesteryl nonanoate is added to the liquid crystal layer 4 of the first cell layer $C_1$ and 1.08 wt % of CB15 is added to the liquid crystal layer 4 of the second cell layer $C_2$, and moreover the angles $\theta_1$ and $\theta_2$ of twist of the liquid crystal molecules in the first and second cell layers $C_1$ and $C_2$ are set to the values of 240° and 270°, respectively (i.e., $\theta_1 = 240°$ and $\theta_2 = 270°$). The polarizer 5a and the detector 5b are placed at an angle of 30° (i.e., $|\Psi| = 30°$). The other conditions are the same as those of Example 1. FIG. 8 shows the dependence of the light transmittance on the applied voltage with regard to the double-layered type TN-LCD of this invention, wherein the wavelengths λ examined herein are 610 nm for red, 550 nm for green, and 450 nm for blue. FIG. 8 indicates that the transmittance characteristics of the wavelengths for red, green, and blue in the double-layered-type cell are sufficiently high and agree with each other, so that a bright, distinct black-and-white display image of the positive-display type can be attained.

Figure 9:
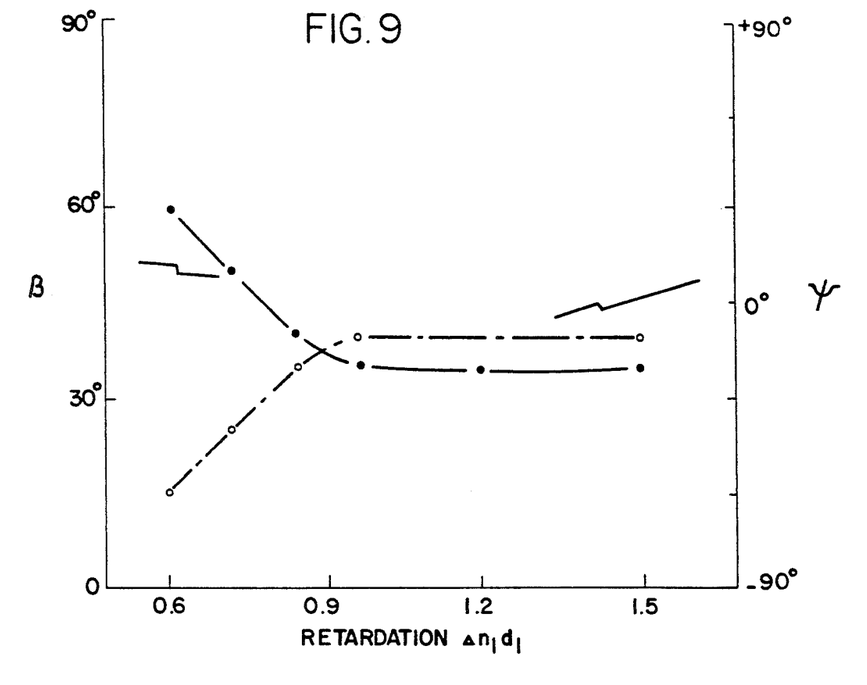
FIG. 9 is of characteristic curves showing the relationship among the retardation $\Delta n_1 \cdot d_1$, the angle $\beta$ between the orientation of the liquid crystal molecules on the light-incident side in the first cell layer and the polarizer, and the angle $\Psi$ between the light-detector and the polarizer at the time when a positive-type display is attained.

In the above-mentioned examples, the polarizer $5a$ and the detector $5b$ are used to obtain a display image of the positive-display type. In order to attain excellent display characteristics, the positional conditions of the polarizer and the detector must be changed depending upon the value of retardation $\Delta n_1 \cdot d_1$, the difference in angles of twist between the liquid crystal molecules in the first and second cell layers, and the difference in angles between the orientation between the liquid crystal molecules of the first cell layer that are nearest the second cell layer and the liquid crystal molecules of the second cell layer that are nearest the first cell layer. For example, FIG. 9 shows the changes of the positional conditions of the polarizer and the detector depending upon the value retardation $\Delta n_1 \cdot d_1$, wherein $\beta$ is an angle between the orientation of the liquid crystal molecules of the first cell layer on the light-incident side and the polarizer, and $\Psi$ is an angle between the polarizer and the detector. In FIG. 9, $\beta$ and $\Psi$ are the optimum values at which the maximum contrast can be attained. The range that is suitable for display is that $\beta = \beta_0 \pm 20°$ ($\beta_0$ being the optimum value of $\beta$) and $\Psi = \Psi_0 + 20°$ ($\Psi$ being the optimum value of $\Psi$). The angles $\theta_1$ and $\theta_2$ of twist of the liquid crystal molecules in the first and second cell layers are 240° and 270°, respectively (i.e., $\theta_1 = 240°$ and $\theta_2 = 270°$), and the angle $\alpha$ between the orientation of the liquid crystal molecules of the first cell layer that are nearest the second cell layer and the liquid crystal molecules of the second cell layer that are nearest the first cell layer is 90° (i.e., $\alpha = 90°$). In this manner, when the values of $\beta$ and $\Psi$ are changed depending upon the value of retardation, a black-and-white display image with high contrast of the positive-display type can be obtained.

Figure 10:
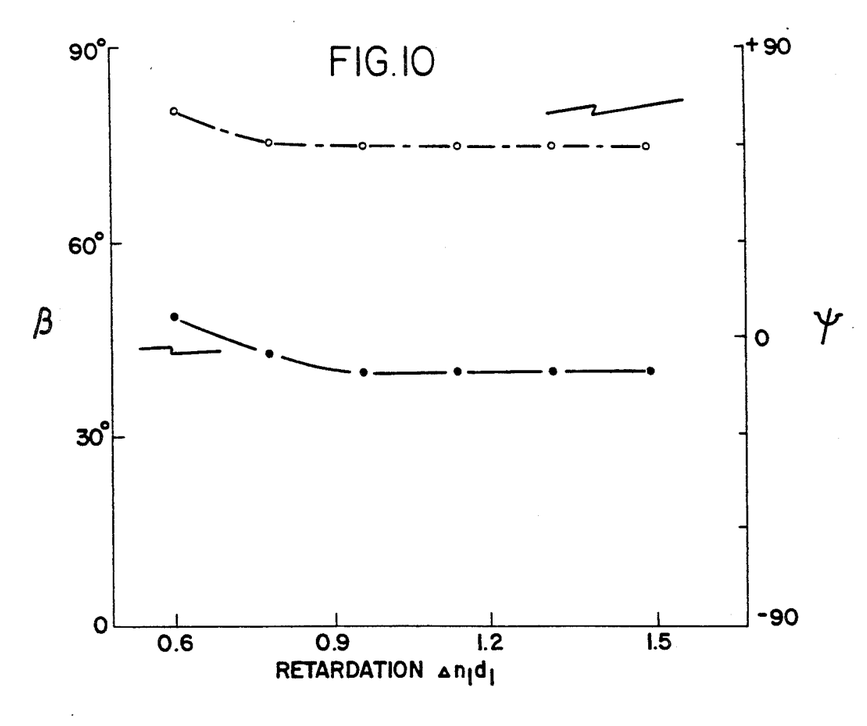
FIG. 10 is of characteristic curves showing the relationship among the value of $\Delta n_1 \cdot d_1$, the value of $\beta$, and the value of $\Psi$ at the time when a negative-type display is attained.

In order to attain a display image of the negative-display type, the positional conditions of the polarizer $5a$ and the detector $5b$ must be changed depending upon the difference in angles of twist between the liquid crystal molecules in the first and second cell layers, or the like. FIG. 10 shows the changes of the positional conditions of the polarizer and the detector depending upon the value of $\Delta n_1 \cdot d_1$ at the time when a negative display is carried out. The values of $\theta_1$ and $\theta_2$ are set to be 240° and 270°, respectively (i.e., $\theta_1 = 240°$ and $\theta_2 = 270°$), and the value of $\alpha$ is set to be 90° (i.e., $\alpha = 90°$). In case of the negative display, the changes of $\beta$ and $\Psi$ depending upon the value of $\Delta n_1 \cdot d_1$, are small. Moreover, when $\theta_1$ is set at 240° (i.e., $\theta_1 = 240°$), the optimum values of $\beta$ and $\Psi$ at which the maximum contrast can be attained are as follows: $\beta \approx 40°$ and $\Psi \approx \alpha + \theta_1 - \theta_2$. The range that is suitable for display is that $\beta = 40° \pm 20°$ and $\Psi = \alpha + \theta_1 - \theta_2 \pm 20°$. The optimum values of $\beta$ and $\Psi$ at the time when the value of $\theta_1$ is in the range of 180° to 360° are represented as follows: $\beta \approx (\theta_1 = 180°)/2 + 10°$ and $\Psi \approx \alpha + \theta_1 - \theta_2$. It was found that the range suitable for display is that $\beta = (\theta_1 - 180°)/2 + 10° \pm 20°$ and $\Psi = \alpha + \theta_1 - \theta_2 + 20°$.

As mentioned above, by determining the values of $\beta$ and $\Psi$, a black-and-white display image with high contrast of the negative-display type can be obtained.

EXAMPLE 4

Inside the liquid crystal cell layer with the transparent conductive films 2 of each of the display devices in the above-mentioned examples, color (red, green and blue) filter layers of a gelatin film are disposed. The display devices with the color filter layers are subjected to a single-multiplex drive, with the formation of a distinct, clear color image.

EXAMPLE 5

The liquid crystal cells of this invention are used in place of a liquid/crystal panel with color filters that is provided with a TFT (Thin Film Transistor) as an active device, and are examined for color display tests by an active matrix drive. They produce a distinct and clear color image, so they are useful for full-color display and multi-color display.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A liquid-crystal display device comprising:
a multi-layered-type liquid crystal cell that is composed of first and second cell layers, each said cell layer containing liquid crystal molecules with a twisted nematic orientation therein,
in the absence of an electric field the liquid/crystal molecules in the first and second cell layers assuming opposite direction twists substantially in the ranges of 180° to 360° and 150° to 390°, respectively; the orientations of the most proximate liquid crystal molecules in the first and second cell layers being at an angle of 70° to 150° relative to each other; the difference between the angle of twist of the liquid crystal molecules in the first cell layer and the angle of twist of the liquid/crystal molecules of the second cell layer being in the range of 30° to 90°; the relationship between the product $\Delta n_1 \cdot d_1$ of the birefringence $\Delta n_1$ and the thickness $d_1$ of the first liquid crystal cell layer and the product $\Delta n_2 \cdot d_2$ of the birefringence $\Delta n_2$ and the thickness $d_2$ of the second liquid crystal cell layer being represented by the following inequality:

$$0.7 < \Delta n_1 \cdot d_1 / \Delta n_2 \cdot d_2 < 1.4$$

the dependence of the value $\Delta n_1$ on the wavelength of light being larger than that of the value $\Delta n_2$ on the wavelength of light.

2. A liquid crystal display device according to claim 1, wherein said first cell layer has a voltage-applying means.

3. A liquid crystal display device according to claim 1, wherein the absolute value of each of the products $\Delta n_1 \cdot d_1$ and $\Delta n_2 \cdot d_2$ is in the range of 0.3 to 3.0.

4. A liquid-crystal display device according to claim 1, wherein said multi-layered-type liquid crystal cell is negative-display type which is shut when an OFF-voltage is applied and transmissive when an ON-voltage is applied.

* * * * *

UNITED STATES PATENT AND TRADEMARK OFFICE
CERTIFICATE OF CORRECTION

PATENT NO. : 5,155,608

DATED : 13 October 1992

INVENTOR(S) : Hatano

It is certified that error appears in the above-identified patent and that said Letters Patent is hereby corrected as shown below:

On the title page, item [30], under Foreign Application Priority Data, the application number reading "62-180535" should read --63-180535--.

Signed and Sealed this

Second Day of November, 1993

*Attest:*

BRUCE LEHMAN

*Attesting Officer*     *Commissioner of Patents and Trademarks*